US012547896B2

(12) United States Patent
Demaj et al.

(10) Patent No.: US 12,547,896 B2
(45) Date of Patent: Feb. 10, 2026

(54) METHOD FOR UPDATING AN ARTIFICIAL NEURAL NETWORK

(71) Applicant: STMicroelectronics (Rousset) SAS, Rousset (FR)

(72) Inventors: Pierre Demaj, Nice (FR); Laurent Folliot, Gourdon (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 1095 days.

(21) Appl. No.: 17/510,273

(22) Filed: Oct. 25, 2021

(65) Prior Publication Data

US 2022/0164664 A1 May 26, 2022

(30) Foreign Application Priority Data

Nov. 24, 2020 (FR) ...................................... 2012081

(51) Int. Cl.
*G06N 3/082* (2023.01)
*G06F 7/02* (2006.01)
*G06F 7/499* (2006.01)

(52) U.S. Cl.
CPC ............... *G06N 3/082* (2013.01); *G06F 7/02* (2013.01); *G06F 7/49947* (2013.01)

(58) Field of Classification Search
CPC ............................... G06F 7/02; G06F 7/49947
USPC ......................................................... 706/15
See application file for complete search history.

(56) References Cited

U.S. PATENT DOCUMENTS

2017/0228637 A1* 8/2017 Santoro .................. G06N 3/063

OTHER PUBLICATIONS

Jacob et al., "Quantization and Training of Neural Networks for Efficient Inter-Arithmetic-Only Inference", CVPR 2018 (Year: 2018).*
Roth, Wolfgang et al., "Resource-Efficient Neural Networks for Embedded Systems," Cornell University Ithaca, NY 14853, Jan. 7, 2020, 37 pages.
Wang, Maolin et al., "NITI: Training Integer Neural Networks Using Integer-only Arithmetic," arxiv.org, Cornell University Library, Sep. 28, 2020, 9 pages.
Wu, Shuang et al., "Training and Inference With Integers in Deep Neural Networks," Cornell University Ithaca, NY, 14853, Feb. 13, 2018, 14 pages.

* cited by examiner

Primary Examiner — Tsu-Chang Lee
(74) Attorney, Agent, or Firm — Slater Matsil, LLP

(57) ABSTRACT

According to one aspect, the disclosure proposes a method for updating an artificial neural network including initial weights stored in a memory at least in an integer format, which method includes: a processing unit determining the error gradients at the output of the layers of the neural network, the processing unit retrieving the initial weights from memory, the processing unit updating the initial weights comprising, for each initial weight, a first calculation of a corrected weight, in the integer format of this initial weight, the processing unit replacing the value of the initial weights stored in the memory by the value of the corrected weights.

20 Claims, 2 Drawing Sheets

METHOD FOR UPDATING AN ARTIFICIAL NEURAL NETWORK

CROSS-REFERENCE TO RELATED APPLICATIONS

This application claims priority to French Application No. FR 2012081, filed on Nov. 24, 2020, which application is hereby incorporated by reference in its entirety.

TECHNICAL FIELD

The present disclosure generally relates to artificial neural networks and, in particular embodiments, to an updating of weights in layers of an artificial neural network.

BACKGROUND

Artificial neural networks are used to perform given functions when they are run. For example, one function of a neural network can be classification. Another function can consist in generating a signal from an input signal received.

Artificial neural networks generally include a succession of neuron layers. Each layer receives, at its input, data to which weights are applied and outputs data after processing by activation functions of the neurons of the layer. The output data is then transmitted to the next layer in the neural network.

The weights are parameters that can be configured to obtain correct output data.

Neural networks can be, for example, implemented by final hardware platforms, such as microcontrollers integrated into connected objects.

Neural networks are generally trained during a learning phase before being integrated into the final hardware platform. The learning phase can be supervised or otherwise. The learning phase allows the weights of the neural network to be adjusted to obtain correct output data from the neural network, in which the neural network can be run by inputting already classified data from a reference database. The weights are adapted as a function of the output data from the neural network with respect to expected data.

Moreover, before being integrated into a hardware platform, the neural network can be quantized to speed up the running thereof and reduce memory requirements. In particular, quantization of the neural network can consist of changing the neural network data format, such as the weights, which can be in a floating-point format, into an integer format.

Quantizing the neural network procures a lighter neural network. Such a neural network can be run quickly by numerous hardware platforms by, for example, microcontrollers.

Furthermore, in some applications, updating the weights of the layers can be advantageous after the neural network has been embedded in the final hardware platform.

More specifically, for example, the neural network could have been trained using data that are not representative of the environment in which the neural network is implemented after having been embedded in the hardware platform.

Thus, the adaptation of the weights carried out during the learning phase could be non-optimal for the environment in which the neural network is implemented. Updating the neural network's weights thus allows the neural network to be adapted to the environment in which it is used.

The weights can be updated by a gradient backpropagation method, which is well known to a person skilled in the art. This method uses a floating-point weight format. In particular, the weights of the neural network represented as integers are converted to obtain a floating-point weight format. Performing gradient backpropagation using floating-point weights can require significant memory resources.

The weights of the neural network thus can be updated using a remote server when the final hardware platform does not have sufficient resources to perform this update. The updated neural network is then quantized in order to obtain an integer weight format. The updated quantized neural network is then transmitted to the final hardware platform via the Internet using wireless transmission.

Thus, the memory resources required do not always allow the final hardware platform to update itself. Moreover, the power consumed to transmit the updated quantized neural network to the hardware platform is high as regards the hardware platform. However, the hardware platform generally has a limited amount of power.

Moreover, converting the weights to a floating-point format to carry out gradient backpropagation is memory-intensive. Thus, it would be advantageous to have a method for allowing a neural network to be directly updated by the final hardware platform.

SUMMARY

According to one aspect, the disclosure proposes a method for updating an artificial neural network including initial weights stored in a memory at least in an integer format, which method includes: a processing unit determining the error gradients at the output of the layers of the neural network, the processing unit retrieving the initial weights from the memory, the processing unit updating the initial weights comprising, for each initial weight, a first calculation of a corrected weight, in the integer format of this initial weight, according to the formula:

$$w_{qijcorr}^{(l)} = w_{qij}^{(l)} + \text{round}\left(\frac{k}{\text{Scale }(n)}\sum\frac{dE}{dw(1)ij}\right),$$

where $w_{q\ ij\ corr}^{(l)}$ is the value of the corrected weight, $w_{q\ ij}^{(l)}$ is the value of the initial weight, $\lambda$ is a learning rate, Scale(n) is a quantization step size of the weight, $$\sum\frac{dE}{dw(1)ij}$$

is a sum of the error gradients with respect to the weights and the round( ) function is a rounding up or down to the nearest integer, the processing unit replacing the value of the initial weights stored in the memory by the value of the corrected weights.

Thus, each weight is updated by adding thereto a rounded result of the sum of the error gradients with respect to the weights multiplied by a ratio of the learning rate A to the quantization step size used to represent the initial weights. The calculation carried out to update the weights gives weights directly in integer format. Such an update method thus avoids the need to involve a floating-point weight format. As a result, the memory resources required to carry out the update are minimized.

The method for updating the weights can thus be implemented directly by the final hardware platform that uses the neural network. For example, such a method for updating the weights can be implemented directly by a microcontroller. Thus, updating the weights on a remote server can be avoided. The method for updating the weights thus makes it possible to limit power consumption, particularly when implemented by the final hardware platform. Moreover, such an update method is quick to implement since the calculation is performed directly on weights in integer format.

A final hardware platform can thus routinely adapt the neural network from new data acquired in an environment where the final hardware platform is located. Preferably, the sum of the error gradients with respect to the weights is calculated according to a so-called "batch" method well known to a person skilled in the art.

In one advantageous implementation, the initial weights are updated for each neural network layer from the last layer to the first layer of the neural network.

In one advantageous implementation, the rounding method used to determine the value of the corrected weight is stochastic rounding.

Furthermore, the values of the corrected weights can change after several weight updates and can thus start to differ from the values of the weights of the neural network before the first update. The corrected weights are advantageously re-quantized to avoid saturation of the weights or a loss of accuracy for low-value weights. Thus, in one advantageous implementation, updating the weights further includes a quantization of the corrected weights.

The quantization of the corrected weights allows good performance levels to be maintained as regards the running of the neural network.

In one advantageous implementation, the quantization of a corrected weight of a layer of the neural network includes determining a minimum weight and a maximum weight from a set of the corrected weights of the layer, the set comprising the corrected weight to be quantized.

The set can be the set of the weights of the layer when the layer is quantized uniformly or the set of the weights of a same channel of the layer when the layer is quantized per channel.

In one advantageous implementation, the quantization of the corrected weight further includes: the processing unit retrieving a zero-point value associated with the initial weight stored in the memory, the processing unit updating the zero-point value associated with the corrected weight using the formula:

$$Zp(n+1) = int\left(clip\left(round\left(\frac{\max(n)*\min q - \min(n)*\max q}{\max(n) - \min(n)}\right), \min q, \max q\right)\right),$$

where Zp(n+1) is the updated zero-point value, minq and maxq are respectively the minimum and maximum values that the weights can take according to the weight format, $\min(n)=Scale(n)\cdot\min_q(n)-Zp(n)$ and $\max(n)=Scale(n)\cdot\max_q(n)-Zp(n)$, Zp(n) being the zero-point value stored in the memory, minq(n) being the minimum value of the corrected weights of the set of weights, and maxq(n) being the maximum value of the corrected weights of the set of weights, the processing unit replacing the zero-point value stored in the memory by the updated zero-point value.

The clip( ) function is configured to maintain the values of the expression $$round\left(\frac{\max(n)*\min q - \min(n)*\max q}{\max(n) - \min(n)}\right)$$

within a value range [minq; maxq].

The int( ) function returns an integer equivalent to the result of the expression $$clip\left(round\left(\frac{\max(n)*\min q - \min(n)*\max q}{\max(n) - \min(n)}\right), \min q, \max q\right).$$

For example, when the weights are in an asymmetric 8-bit unsigned format, the minimum value minq is equal to 0 and the maximum value maxq is equal to 255. When the weights are in a symmetric 8-bit signed format, the minimum value minq is equal to −127 and the maximum value maxq is equal to 127.

In one advantageous implementation, the quantization of the corrected weight further includes: the processing unit retrieving a value of a quantization step size of the initial weight stored in the memory, the processing unit updating the value of the quantization step size according to the formula:

$$Scale(n+1) = \frac{Scale(n).(\max_q(n) - \min_q(n))}{\max q - \min q},$$

where Scale(n+1) is the value of the updated quantization step size, minq(n) is the minimum value of the corrected weights of the set of weights, maxq(n) is the maximum value of the corrected weights of the set of weights, Scale(n) is the value of the quantization step size stored in the memory, and minq and maxq are respectively the minimum and maximum values that the weights can take, the processing unit replacing the value of the quantization step size stored in the memory by the value of the updated quantization step size.

In one advantageous implementation, the quantization of the corrected weight includes calculating a quantized value of the corrected weight.

In particular, the quantized value of the corrected weight can be calculated using the formula:

$$w_{qijcorr}^{(l)}(n+1) = round\left((\max q - \min q).\left(\frac{Scale(n).w_{qijcor}^{(l)}(n) - Zp(n)}{Scale(n).(\max_q(n) - \min_q(n))}\right) + Zp(n+1)\right),$$

where $w_{q\,ij\,corr}^{(l)}(n+1)$ is the quantized value of the corrected weight, $w_{q\,ij\,corr}^{(l)}(n)$ is the value of the corrected weight obtained according to the first calculation, minq(n) is the minimum value of the corrected weights of the set of weights, maxq(n) is the maximum value of the corrected weights of the set of weights, minq and maxq are respectively the minimum and maximum values that the weights can take according to the weight format, Scale(n) is the former value of the quantization step size stored in the memory, Zp(n+1) is the updated zero-point value and Zp(n) is the former zero-point value stored in the memory.

Nonetheless, when the quantization is symmetric, the quantized value of the corrected weight can be calculated, using the formula:

$$w^{(l)}_{qijcorr}(n+1) = \text{round}\left(\frac{(2^{N-1}-1)*w^{(l)}_{qijcorr}(n)}{\max(|\max_q(n)|,|\min_q(n)|)}\right),$$

where $w_{q\ ij\ corr}^{(l)}(n+1)$ is the quantized value of the corrected weight, $w_{q\ ij\ corr}^{(l)}(n)$ is the value of the corrected weight obtained according to the first calculation, $\min_q(n)$ is the minimum value of the corrected weights of the set of weights, $\max_q(n)$ is the maximum value of the corrected weights of the set of weights, and N is the bit number of the weight format (for example 8 bits).

Preferably, the values that can be taken by the expression $$\frac{1}{\max(|\max_q(n)|,|\min_q(n)|)}$$

for each possible value of the expression max ($|\max_q(n)|$, $|\min_q(n)|$) are recorded in a look-up table stored in the memory.

Furthermore, each layer of the neural network can be quantized uniformly, known as per-layer quantization, or can be quantized differently for each channel of the layer, known as per-channel quantization.

However, when updating the weights, the type of quantization, per layer or per channel, of the layers of the neural network can be advantageously adapted in order to improve the running of the neural network.

In particular, during the learning phase, the neural network is quantized per layer or per channel as a function of the learning results.

In general, per-channel quantization procures a higher accuracy for the neural network for a slight increase in the run time of the neural network. More specifically, a per-channel quantized layer is generally run over a greater number of clock cycles than a uniformly quantized layer.

Nonetheless, in some cases, per-channel quantization and per-layer quantization can procure equivalent accuracy. Thus, in this case, per-layer quantization can be advantageously used to reduce the neural network run time.

Thus, in one advantageous implementation, the method further includes the following steps carried out for each layer by the processing unit: calculating a decision-making criterion, then comparing the decision-making criterion with a threshold value, then quantizing the corrected weights uniformly for each corrected weight of the layer or independently per channel of the layer according to a result of the comparison.

In one advantageous implementation, the decision-making criterion is calculated according to the formula:

$$C0 = \frac{Scale_l(n+1)}{\min(Scale_c(n+1))},$$

where $Scale_l(n+1)$ is a quantization step size that can be defined for the entire layer and $\min(Scale_c(n+1))$ is the smallest quantization step size from among the quantization step sizes that can be defined for each channel of the layer.

In one advantageous implementation, for a layer initially quantized uniformly, if the decision-making criterion is greater than or equal to a threshold value included between six and ten, then the quantization of the corrected weights is carried out by per-channel quantization.

In one advantageous implementation, for a layer initially quantized per channel, if the decision-making criterion is less than or equal to a threshold value greater than one and less than or equal to four, then the quantization of the corrected weights is carried out by uniform quantization for each corrected weight of the layer.

According to another aspect, the disclosure proposes a microcontroller comprising: a memory configured to store initial weights of the layers of a neural network according to at least one given integer format, a processing unit configured for: determining the error gradients at the output of the layers of the neural network, retrieving the initial weights from memory, updating the initial weights comprising, for each initial weight, a first calculation of a corrected weight, in the integer format of this initial weight, according to the formula:

$$w^{(l)}_{qijcorr} = w^{(l)}_{qi,j} + \text{round}\left(\frac{\lambda}{Scale\ (n)}\sum \frac{dE}{dw(1)ij}\right),$$

where $w_{q\ ij\ corr}^{(l)}$ is the value of the corrected weight, $w_{q\ ij}^{(l)}$ is the value of the initial weight, $\lambda$ is a learning rate, Scale(n) is a quantization step size of the weight, $$\sum \frac{dE}{dw(1)ij}$$

is a sum of the error gradients with respect to the weights, and the round( ) function is a rounding up or down to the nearest integer, replacing the value of the initial weights stored in the memory by the value of the corrected weights.

Advantageously, the microcontroller thus includes a memory configured to store initial weights of the layers of a neural network according to at least one given integer format and a processing unit configured to implement the method described hereinabove.

According to another aspect, the disclosure proposes a computer program product comprising instructions which, when the program is run by a processing unit, cause the latter to implement the method described hereinabove.

BRIEF DESCRIPTION OF THE DRAWINGS

Other advantages and features of the disclosure will become apparent upon examining the detailed description of non-limiting embodiments and implementations, and from the accompanying drawings in which.

DETAILED DESCRIPTION OF ILLUSTRATIVE EMBODIMENTS

The neural network is defined by parameters well known to a person skilled in the art, such as weights. The neural network includes an input layer, an output layer and at least one hidden layer between the input layer and the output layer. Each layer can include at least one channel. Each channel includes at least one weight.

The weights of each layer are integers defined according to one or more formats. In particular, each weight can be defined according to the quantized value thereof, a quantization step size, and a zero-point. In particular, a weight can be expressed according to the following formula: $s_w \times (q_w - zp_w)$, where $s_w$ is the quantization step size, $q_w$ is the quantized value of the weight, and $zp_w$ is the zero-point of the quantization.

Each layer can be quantized uniformly or per channel. When the layer is quantized uniformly, all the weights of a layer have the same format. When the layer is quantized per channel, the weights of the same channel have the same format. However, the weight formats of different channels are not necessarily the same. Each channel is thus quantized independently of the other channels of the layer.

The values of the weights of the neural network and the quantization thereof can be defined after a learning phase carried out before the neural network is integrated into a microcontroller. The learning phase can be supervised or otherwise. The learning phase allows the weights of the neural network to be adjusted. For this purpose, the neural network can, for example, be run by inputting already classified data from a reference database.

Figure 1:
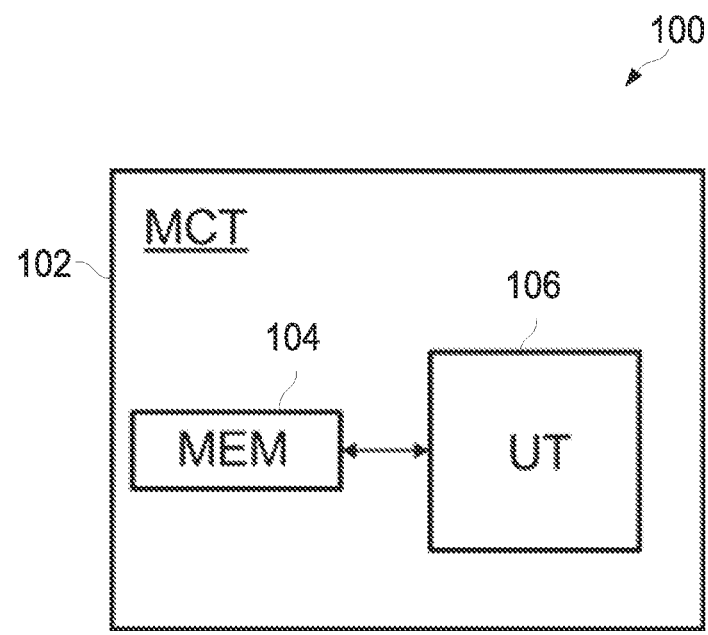
FIG. 1 is an embodiment microcontroller used as implemented in the final hardware platform integrating a neural network.

FIG. 1 illustrates a diagram 100 of an embodiment microcontroller 102. As shown, the microcontroller 102 includes a memory 104 and a processing unit 106. It should be appreciated the microcontroller 102 may include additional components not shown.

In particular, microcontroller 102 includes the memory 104 in which the parameters of the neural network are stored. In embodiments, the weights of the layers of the neural network (i.e., the quantized values of the weights), the quantization step sizes thereof, and the zero-points thereof. In embodiments, memory 104 is a non-volatile memory type.

The microcontroller 102 may further include the processing unit 106. The processing unit 106 can be a processor or the like. The processing unit 106 can be configured to run the neural network from data received at the input of the neural network. Running the neural network allows data to be output as a function of the data received at the input of the neural network. For example, a neural network can output a classification of the input data received or generate an output signal from a signal received at the input of the neural network.

The neural network can be implemented in an environment in which the microcontroller 102 is placed. This environment can be different from the environment in which the neural network was trained. The processing unit 106 can further be configured to update the neural network's weights to adapt the neural network to the environment in which it is implemented by implementing the method described hereinbelow in reference to FIG. 2.

In embodiments, the microcontroller 102 has, in the memory, a computer program product comprising instructions which, when run by the processing unit 106, cause the latter to implement the method described hereinbelow.

Figure 2:
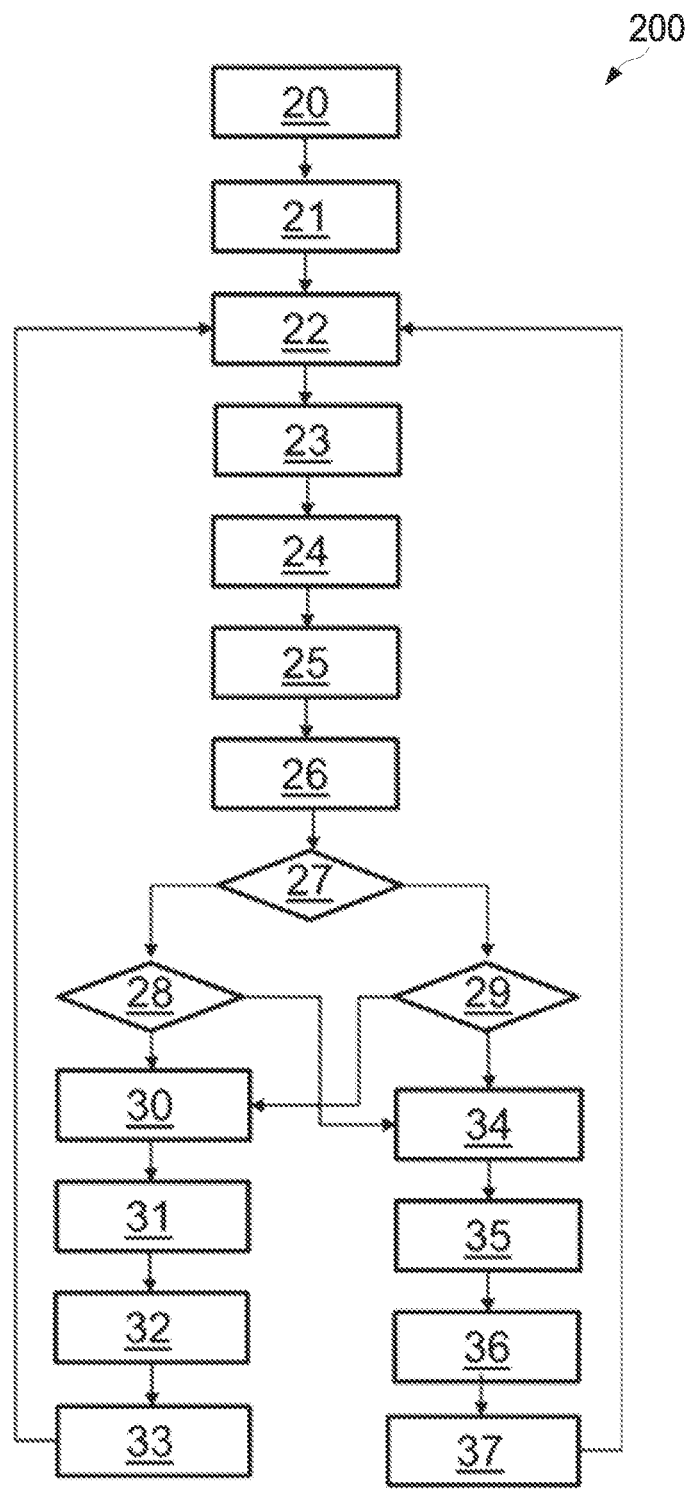
FIG. 2 is a flow diagram of an embodiment method of operation.

FIG. 2 illustrates a flow diagram 200 of an embodiment method, as may be implemented in the microcontroller 102. The method includes a step 20, where the processing unit 106 implements the neural network several times with different data. The processing unit 106 calculates a total error according to a so-called "batch" method well known to a person skilled in the art from the output results of the neural network following the various implementations thereof.

The method then includes a step 21, where processing unit 106 calculates error gradients at the output of the layers of the neural network. In embodiments, the processing unit 106 calculates the error gradients using a gradient backpropagation method.

The method then includes a succession of steps 22 to 37 which is carried out for each layer from the output layer of the neural network to the input layer of the neural network. At step 22, the processing unit 106 retrieves the weights, referred to as the initial weights, of the layer, stored in the memory 104.

Then, at step 23, the processing unit 106 updates the weights of the layer. In embodiments, for each weight of the layer, the processing unit 106 performs an initial calculation of a corrected weight in the integer format of the initial weight stored in the memory 104.

In embodiments, the processing unit 106 calculates each corrected weight using the formula:

$$w_{qij corr}^{(l)} = w_{qi,j}^{(l)} + \text{round}\left(\frac{\lambda}{\text{Scale }(n)} \sum \frac{dE}{dw(1)ij}\right),$$

where $w_{q\,ij\,corr}^{(l)}$ is the value of the corrected weight, $w_{q\,ij}^{(l)}$ is the value of the initial weight, $\lambda$ is a learning rate, Scale(n) is a quantization step size of the weight, $$\sum \frac{dE}{dw(1)ij}$$

is a sum of the error gradients with respect to the weights, and the round( ) function is a rounding up or down to the nearest integer.

Thus, each weight is updated by adding thereto a rounded result of the sum of the error gradients with respect to the weights multiplied by a ratio of the learning rate $\lambda$ to the quantization step size used to represent the weights. Preferably, the rounding method used to determine the value of the weight is stochastic rounding.

The method then includes steps 24 to 36 for adapting the quantization of the corrected weights of the layer to the values of these corrected weights. At step 24, the processing unit 106 determines a minimum weight and a maximum weight from at least one set of the corrected weights of the layer. In embodiments, the processing unit 106 determines the minimum weight and maximum weight of the set of the corrected weights of the layer. Moreover, in embodiments, the processing unit 106 determines the minimum weight and maximum weight of the corrected weights of each channel of the layer.

At step 25, the processing unit 106 calculates quantization step sizes of the corrected weights of the layer. In embodiments, the processing unit 106 calculates a quantization step size for the set of the corrected weights of the layer using the minimum weight and maximum weight of the set of the corrected weights of the layer. For this purpose, processing unit 106 applies the following formula:

$$\text{Scale}_l(n+1) = \frac{\text{Scale }(n).(\max_{ql}(n) - \min_{ql}(n))}{\max q - \min q},$$

where $\min_{ql}(n)$ is the minimum value of the corrected weights of the layer, $\max_{ql}(n)$ is the maximum value of the corrected weights of the layer, Scale(n) is the value of the quantization step size of the initial weights of the layer, and minq and maxq are respectively the minimum and maximum values that the weights can take depending on the weight format. In embodiments, the Scale(n) value is retrieved from memory 104 by the processing unit 106.

For example, when the weights are in an asymmetric 8-bit unsigned format, the minimum value minq is equal to 0 and the maximum value maxq is equal to 255. When the weights are in a symmetric 8-bit signed format, the minimum value minq is equal to −127 and the maximum value maxq is equal to 127.

Moreover, in embodiments, for each channel of the layer, the processing unit 106 calculates a quantization step size of the weights for this channel using the minimum weight and maximum weight of this channel. For this purpose, processing unit 106 applies the formula:

$$Scale_c(n+1) = \frac{Scale(n)(\max_{qc}(n) - \min_{qc}(n))}{\max q - \min q},$$

where $\min_{qc}(n)$ is the minimum value of the corrected weights of the channel, $\max_{qc}(n)$ is the maximum value of the corrected weights of the channel, Scale(n) is the value of the quantization step size of the initial weights of the channel, and minq and maxq are respectively the minimum and maximum values that the weights can take.

At step 26, the processing unit 106 calculates a decision-making criterion to determine whether it is preferable to quantize the layer uniformly or per channel. The decision-making criterion can be calculated according to the formula:

$$C0 = \frac{Scale_l(n+1)}{\min(Scale_c(n+1))},$$

where $Scale_l(n+1)$ is the quantization step size calculated for the entire layer and $\min(Scale_c(n+1))$ is the smallest quantization step size from the quantization step sizes calculated for the different channels.

At step 27, the processing unit 106 determines whether the layer is currently quantized uniformly or per channel. If the layer is initially quantized uniformly, then the processing unit 106 performs a test at step 28. In this test, processing unit 106 compares the value of the decision-making criterion with an integer value X included in the range [6; 10]. If the decision-making criterion is greater than or equal to the value X, then the processing unit 106 determines that it is preferable to quantize the layer per channel for the new corrected weights. Otherwise, processing unit 106 considers that it is preferable to maintain uniform quantization for the layer.

In embodiments, if the layer is initially quantized per channel, the processing unit 106 performs a test in step 29. In this test, processing unit 106 compares the value of the decision-making criterion with an integer value Y in the range [1; 4]. If the decision-making criterion is less than or equal to the value Y, then the processing unit 106 determines that it is preferable to quantize the layer uniformly for the new corrected weights. Otherwise, processing unit 106 considers it preferable to maintain per-channel quantization. In embodiments, the intervals chosen for the integer values X and Y are defined on the basis of experiments.

If the layer is to be uniformly quantized, then processing unit 106 performs uniform quantization of the weights of the layer according to step 30 to step 33. At step 30, processing unit 106 updates the zero-point value stored in memory 104. In embodiments, the zero-point value Zp(n) is retrieved from memory 104 by the processing unit 106. Then, the processing unit 106 can calculate the new zero-point using the following formula:

$$Zp(n+1) = \text{int}\left(\text{clip}\left(\text{round}\left(\frac{\max(n)*\min q - \min(n)*\max q}{\max(n) - \min(n)}\right), \min q, \max q\right)\right),$$

where $Zp(n+1)$ is the updated zero-point value, minq and maxq are respectively the minimum and maximum values that the weights can take, $\min(n) = Scale(n) \cdot \min_{ql}(n) - Zp(n)$ and $\max(n) = Scale(n) \cdot \max_{ql}(n) - Zp(n)$, $Zp(n)$ being the zero-point value stored in the memory 104, $\min_{ql}(n)$ being the minimum value of the corrected weights of the layer, and $\max_{ql}(n)$ being the maximum value of the corrected weights of the layer.

At step 31, the processing unit 106 updates the value of the quantization step size according to the following formula:

$$Scale_1(n+1) = \frac{Scale(n).(\max_{ql}(n) - \min_{ql}(n))}{\max q - \min q},$$

where Scale(n+1) is the value of the updated quantization step size of the weights of the layer, $\min_{ql}(n)$ is the minimum value of the corrected weights of the layer, $\max_{ql}(n)$ is the maximum value of the corrected weights of the layer, Scale(n) is the value of the quantization step size of the initial weights of the layer, and minq and maxq are respectively the minimum and maximum values that the weights can take.

It should be noted that this quantization step size $Scale_l(n+1)$ has already been calculated in step 25. Thus, in embodiments, the processing unit 106 does not necessarily perform the calculation if the value $Scale_l(n+1)$ was previously stored in the memory 104.

At step 32, processing unit 106 re-quantizes the value of the corrected weights. In an embodiment, the quantized value of the corrected weight is calculated using the formula:

$$w_{q\,ij\,corr}^{(l)}(n+1) = $$
$$\text{round}\left((\max q - \min q) \cdot \left(\frac{Scale(n).w_{q\,ij\,cor}^{(l)}(n) - Zp(n)}{Scale(n).(\max_q(n) - \min_q(n))}\right) + Zp(n+1)\right),$$

where $w_{q\,ij\,corr}^{(l)}(n+1)$ is the quantized value of the corrected weight, $w_{q\,ij\,corr}^{(l)}(n)$ is the value of the corrected weight obtained according to the first calculation, $\min_q(n)$ is the minimum value of the corrected weights of the set of weights, $\max_q(n)$ is the maximum value of the corrected weights of the set of weights, minq and maxq are respectively the minimum and maximum values that the weights can take according to the weight format, Scale(n) is the former value of the quantization step size stored in the memory, $Zp(n+1)$ is the updated zero-point value and $Zp(n)$ is the former zero-point value stored in the memory.

Nonetheless, when the quantization is symmetric, the processing unit 106 can use the formula:

$$w_{q\,ij\,corr}^{(l)}(n+1) = \text{round}\left(\frac{(2^{N-1}-1)*w_{q\,ij(n)}^{(l)}}{\max(|\max_{ql}(n)|,|\min_{ql}(n)|)}\right),$$

where $w_{q\,ij\,corr}^{(l)}(n+1)$ is the quantized value of the corrected weight, $w_{q\,ij\,corr}^{(l)}(n)$ is the value of the corrected weight obtained according to the first calculation, $\min_{ql}(n)$ is the minimum value of the corrected weights of the set of weights, $\max_{ql}(n)$ is the maximum value of the corrected weights of the set of weights, and N is the bit number of the weight format (for example 8 bits).

Preferably, the values that can be taken by the expression $$\frac{1}{\max(|\max_{ql}(n)|,|\min_q l(n)|)}$$

for each possible value of the expression max ($|\max_{ql}(n)|$, $|\min_{ql}(n)|$) are recorded in a look-up table stored in the memory 104.

For example, the values that can be taken by the expression max ($|\max_{ql}(n)|,|\min_{ql}(n)|$) are generally close to 127 when the value of the weights is represented using eight-bit symmetric quantization. More specifically, the corrected values of the weights are generally close to the weight values before they are updated. The values that can be taken by the expression $$\frac{1}{\max(|\max_{ql}(n)|,|\min_{ql}(n)|)}$$

for these values are thus pre-calculated, then stored in the look-up table.

Then, the values of the weights, of the quantization step size, and of the zero-point stored in the memory 104 are replaced at step 33 by the newly-calculated values. Furthermore, if the layer is to be quantized per channel, then the processing unit 106 performs quantization of the weights for each channel of the layer in steps 34 and 37.

At step 34, the processing unit 106 updates the zero-point value stored in memory 104. For this purpose, the zero-point value Zp(n) is retrieved from memory 104 by processing unit 106. In embodiments, the processing unit 106 calculates the new zero-point using the following formula:

$$Zp(n+1) = \text{int}\left(\text{clip}\left(\text{round}\left(\frac{\max(n)*\min q - \min(n)*\max q}{\max(n) - \min(n)}\right), \min q, \max q\right)\right),$$

where Zp(n+1) is the updated zero-point value, minq and maxq are respectively the minimum and maximum values that the weights can take, $\min(n)=\text{Scale}(n)\cdot\min_{qc}(n)-Zp(n)$ and $\max(n)=\text{Scale}(n)\cdot\max_{qc}(n)-Zp(n)$, Zp(n) being the zero-point value stored in the memory 104, $\min_{qc}(n)$ being the minimum value of the corrected weights of the channel, $\max_{qc}(n)$ being the maximum value of the weights of the channel.

At step 35, processing unit 106 updates the value of the quantization step size according to the following formula:

$$\text{Scale}_c(n+1) = \frac{\text{Scale}(n).(\max_{qc}(n) - \min_{qc}(n))}{\max q - \min q},$$

where $\text{Scale}_c(n+1)$ is the value of the updated quantization step size of the weights of the channel, $\min_{qc}(n)$ is the minimum value of the corrected weights of the channel, $\max_{qc}(n)$ is the maximum value of the weights of the channel, Scale(n) is the value of the quantization step size of the initial weights of the channel, and minq and maxq are respectively the minimum and maximum values that the weights can take.

In embodiments, this quantization step size $\text{Scale}_c(n+1)$ has already been calculated at step 25. Thus, processing unit 106 does not necessarily perform the calculation if the value $\text{Scale}_c(n+1)$ was previously stored in memory 104.

At step 36, processing unit 106 re-quantizes the value of the corrected weights. In embodiments, the quantized value of the corrected weight can be calculated using the formula:

$$w_{q\,ij\,corr}^{(l)}(n+1) =$$
$$\text{round}\left((\max q - \min q)\cdot\left(\frac{\text{Scale}(n).w_{q\,ij\,cor}^{(l)}(n) - Zp(n)}{\text{Scale}(n).(\max_q(n) - \min_q(n))}\right) + Zp(n+1)\right),$$

where $w_{q\,ij\,corr}^{(l)}(n+1)$ is the quantized value of the corrected weight, $w_{q\,ij\,corr}^{(l)}(n)$ is the value of the corrected weight obtained according to the first calculation, $\min_q(n)$ is the minimum value of the corrected weights of the set of weights, $\max_q(n)$ is the maximum value of the corrected weights of the set of weights, minq and maxq are respectively the minimum and maximum values that the weights can take according to the weight format, Scale(n) is the former value of the quantization step size stored in the memory, Zp(n+1) is the updated zero-point value and Zp(n) is the former zero-point value stored in the memory.

Nonetheless, when the quantization is symmetric, processing unit 106 can use the formula:

$$w_{q\,ij\,corr}^{(l)}(n+1) = \text{round}\left(\frac{(2^{n-1}-1)*w_{q\,i\,j(n)}^{(l)}}{\max(|\max_{qc}(n)|,|\min_{qc}(n)|)}\right),$$

where $w_{q\,ij\,corr}^{(l)}(n+1)$ is the quantized value of the corrected weight, $w_{q\,ij\,corr}^{(l)}(n)$ is the value of the corrected weight obtained according to the first calculation, $\min_q(n)$ is the minimum value of the corrected weights of the set of weights, $\max_q(n)$ is the maximum value of the corrected weights of the set of weights, and N is the bit number of the weight format (for example 8 bits).

As before, the values that can be taken by the expression $$\frac{1}{\max(|\max_{qc}(n)|,|\min_{qc}(n)|)}$$

for each possible value of the expression max ($|\max_{qc}(n)|$, $|\min_{qc}(n)|$) are recorded in a look-up table stored in memory 104. Then the values of the weights, of the quantization step size, and of the zero-point stored in memory 104 are replaced at step 37 by the newly calculated values.

After performing steps 22 to 37 for a given layer of the neural network, processing unit 106 repeats these steps for the layer directly preceding the given layer in the neural network. The calculation carried out to update the weights gives weights directly in integer format. Such an update method thus avoids the need to involve a floating-point weight format. As a result, the memory resources required to carry out the update are minimized.

The method for updating the weights can thus be implemented directly by the final hardware platform that uses the neural network. For example, such a method for updating the weights can be implemented directly by a microcontroller 102. The updating of the weights on a remote server can thus be avoided. The method for updating the weights thus makes it possible to limit power consumption, in particular when it is implemented by the final hardware platform. Moreover, such an update method is quick to implement since the calculation is performed directly on weights in integer format.

A final hardware platform can thus routinely adapt the neural network from new data acquired in an environment in which the final hardware platform is located. The adaptation of the quantization of the corrected weights allows good performance levels to be maintained as regards the running of the neural network.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

It is understood that the embodiments of this disclosure are not limited to applications disclosed herein regarding the measurement of a voltage drop at a reserve capacitor in a supplemental restraint system. The various embodiments are also applicable to other applications that benefit from measuring a voltage drop at a terminal of an electronic circuit having an unknown baseline voltage.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   determining, by a processor, error gradients at an output of layers of an artificial neural network;
   retrieving, by the processor, initial weights of the artificial neural network from memory, the initial weights being at least in an integer format;
   updating, by the processor, the initial weights to corrected weights, each initial weight updated to a corrected weight based on a value of the initial weight, a learning rate, a quantization step size of the initial weight, and a sum of the error gradients with respect to the initial weights;
   replacing, by the processor, a value of the initial weights with the corrected weights in the memory; and
   executing, by the processor, the artificial neural network with the corrected weights to process input data received from an environment in which the processor is located, wherein the corrected weights adapt the artificial neural network to the environment in an absence of external server processing.

2. The method of claim 1, wherein each initial weight is updated to the corrected weight based on the formula:

$$w_{q\,ij\,corr}^{(l)} = w_{q\,ij}^{(l)} + \text{round}\left(\frac{\lambda}{\text{Scale}(n)} \sum \frac{dE}{dw(1)ij}\right),$$

wherein $w_{q\,ij\,corr}^{(l)}$ is the value of the corrected weight, $w_{q\,ij}^{(l)}$ is the value of the initial weight, $\lambda$ is the learning rate, Scale(n) is a value of the quantization step size of the initial weight, $$\sum \frac{dE}{dw(1)ij}$$

is the sum of the error gradients with respect to the initial weights, and round( ) is a function for rounding up or down to a nearest integer.

3. The method of claim 2, wherein the round ( ) function is stochastic rounding.

4. The method of claim 1, wherein updating the initial weights to the corrected weights comprises updating for each layer of the artificial neural network from a last layer to a first layer of the artificial neural network.

5. The method of claim 1, wherein the updating the initial weights further comprises quantization of the corrected weights of each layer of the artificial neural network, the quantization of the corrected weights comprising determining a minimum weight and a maximum weight from a set of the corrected weights of the each layer comprising the corrected weight to be quantized.

6. The method of claim 1, wherein the updating the initial weights further comprises quantization of the corrected weights of each layer of the artificial neural network, the quantization of each corrected weight comprising:
   retrieving, by the processor, a zero-point value associated with the corresponding initial weight from memory;
   updating, by the processor, the zero-point value associated with the each corrected weight based on the formula:

$$Zp(n+1) = \text{int}\left(\text{clip}\left(\text{round}\left(\frac{\max(n) * \min q - \min(n) * \max q}{\max(n) - \min(n)}\right), \min q, \max q\right)\right),$$

wherein Zp(n+1) is the updated zero-point value, minq and maxq are, respectively, minimum and maximum values that the corrected weights can take, Zp(n) is the zero-point value stored in memory, minq(n) is the minimum value of the corrected weights of set of corrected weights, and maxq(n) is the maximum value of the corrected weights of set of corrected weights, and wherein min(n)=Scale(n)·min$_q$(n)−Zp(n) and max(n)=Scale(n)·max$_q$(n)−Zp(n); and replacing, by the processor, the zero-point value with the updated zero-point value in memory.

7. The method of claim 6, wherein the quantization of each corrected weight further comprises:
retrieving, by the processor, a value of the quantization step size of the initial weight from memory;
updating, by the processor, the value of the quantization step size based on the formula:

$$\text{Scale}(n+1) = \frac{\text{Scale}(n) \cdot (\max_q(n) - \min_q(n))}{\max q - \min q},$$

wherein Scale(n+1) is the value of the updated quantization step size, minq(n) is the minimum value of the corrected weights of a set of weights, maxq(n) is the maximum value of the corrected weights of the set of weights; and
replacing, by the processor, the value of the quantization step size with the updated quantization step size in memory.

8. The method of claim 7, wherein the quantization of the corrected weight includes calculating a quantized value of the corrected weight, based on the formula:

$$w\_(q\ ij\ \text{corr})^\wedge((l))(n+1) = \text{round}\bigl((\llbracket(2\rrbracket \wedge (n-1) - 1) *$$
$$w\_(q\ ij\ \text{corr})^\wedge((l))(n))/(\max(|\llbracket\max\rrbracket\_q(n)|", |"\llbracket\min\rrbracket\_q(n)"|")\bigr),$$

wherein $w_{q\ ij\ corr}^{(l)}(n+1)$ is the quantized value of the corrected weight.

9. The method of claim 1, further comprising:
calculating, for each layer of the artificial neural network, a decision-making criterion;
comparing, for each layer, the decision-making criterion with a threshold value; and
quantizing, for each layer, the corrected weights uniformly for each corrected weight of the layer or independently per channel of the layer according to a result of the comparison.

10. The method of claim 9, wherein the decision-making criterion is calculated based on the formula:

$$C0 = \frac{\text{Scale}_l(n+1)}{\min(\text{Scale}_c(n+1))},$$

wherein $\text{Scale}_l(n+1)$ is a quantization step size that can be defined for the entire layer and $\min(\text{Scale}_c(n+1))$ is the smallest quantization step size from among the quantization step sizes that can be defined for each channel of the layer.

11. The method of claim 10, wherein, for a layer initially quantized uniformly, determining quantization of the corrected weights by a per-channel quantization in response to determining that the decision-making criterion is greater than or equal to a threshold value being between six and ten.

12. The method of claim 10, wherein, for a layer initially quantized per channel, determining quantization of the corrected weights by uniform quantization for each corrected weight of the layer in response to determining that the decision-making criterion is less than or equal to a threshold value being greater than one and less than or equal to four.

13. A microcontroller, comprising:
a non-transitory memory storage comprising instructions; and
a processor in communication with the non-transitory memory storage, the processor configured to execute the instructions to:
determine error gradients at an output of layers of an artificial neural network,
retrieve initial weights of the artificial neural network from the non-transitory memory storage, the initial weights being at least in an integer format,
update the initial weights to corrected weights, each initial weight updated to a corrected weight based on a value of the initial weight, a learning rate, a quantization step size of the initial weight, and a sum of the error gradients with respect to the initial weights, and
replace the initial weights with the corrected weights in the non-transitory memory storage, and
execute the artificial neural network with the corrected weights to process input data received from an environment in which the processor is located, wherein the corrected weights adapt the artificial neural network to the environment in an absence of external server processing.

14. The microcontroller of claim 13, wherein each initial weight is updated to the corrected weight based on the formula:

$$w_{qij\ corr}^{(l)} = w_{qij}^{(l)} + \text{round}\left(\frac{\lambda}{\text{Scale}(n)} \sum \frac{dE}{dw(1)ij}\right),$$

wherein $w_{q\ ij\ corr}^{(l)}$ is the value of the corrected weight, $w_{q\ ij}^{(l)}$ is the value of the initial weight, $\lambda$ is the learning rate, Scale(n) being the value of the quantization step size of the initial weight, $$\sum \frac{dE}{dw(1)ij}$$

is the sum of the error gradients with respect to the initial weights, and round( ) is a function for rounding up or down to a nearest integer.

15. The microcontroller of claim 13, wherein the processor is configured to execute the instructions to:
calculate, for each layer of the artificial neural network, a decision-making criterion;
compare, for each layer, the decision-making criterion with a threshold value; and
quantize, for each layer, the corrected weights uniformly for each corrected weight of the layer or independently per channel of the layer according to a result of the comparison.

16. The microcontroller of claim 13, wherein the updating the initial weights further comprises quantization of the corrected weights of each layer of the artificial neural network, the quantization of the corrected weights comprising determining a minimum weight and a maximum weight from a set of the corrected weights of the each layer comprising the corrected weight to be quantized.

17. A non-transitory computer-readable media storing computer instructions, that when executed by a processor, cause the processor to:

determine error gradients at an output of layers of an artificial neural network;

retrieve initial weights of the artificial neural network from the non-transitory computer-readable media, the initial weights being at least in an integer format;

update the initial weights to corrected weights, each initial weight updated to a corrected weight based on a value of the initial weight, a learning rate, a quantization step size of the initial weight, and a sum of the error gradients with respect to the initial weights;

replace the initial weights with the corrected weights in the non-transitory computer-readable media; and execute the artificial neural network with the corrected weights to process input data received from an environment in which the processor is located, wherein the corrected weights adapt the artificial neural network to the environment in an absence of external server processing.

18. The non-transitory computer-readable media of claim 17, wherein each initial weight is updated to the corrected weight based on the formula:

$$w_{q\ ij\ corr}^{(l)} = w_{q\ ij}^{(l)} + \text{round}\left(\frac{\lambda}{\text{Scale}(n)} \sum \frac{dE}{dw(1)ij}\right),$$

wherein $w_{q\ ij\ corr}^{(l)}$ is the value of the corrected weight, $w_{q\ ij}^{(l)}$ is the value of the initial weight, $\lambda$ is the learning rate, Scale(n) being the value of the quantization step size of the initial weight, $$\sum \frac{dE}{dw(1)ij}$$

is the sum of the error gradients with respect to the initial weights, and round( ) is a function for rounding up or down to a nearest integer.

19. The non-transitory computer-readable media of claim 17, wherein the computer instructions, when executed by the processor, cause the processor to:

calculate, for each layer of the artificial neural network, a decision-making criterion;

compare, for each layer, the decision-making criterion with a threshold value; and quantize, for each layer, the corrected weights uniformly for each corrected weight of the layer or independently per channel of the layer according to a result of the comparison.

20. The non-transitory computer-readable media of claim 17, wherein the updating the initial weights further comprises quantization of the corrected weights of each layer of the artificial neural network, the quantization of the corrected weights comprising determining a minimum weight and a maximum weight from a set of the corrected weights of the each layer comprising the corrected weight to be quantized.

* * * * *